(12) United States Patent
Vimpari et al.

(10) Patent No.: US 8,521,205 B2
(45) Date of Patent: Aug. 27, 2013

(54) PREAMBLE LENGTH FOR DISCONTINUOUS CONTROL CHANNEL TRANSMISSION

(75) Inventors: Anna-Mari Vimpari, Oulu (FI); Esa Malkamäki, Espoo (FI); Jukka Nauha, Oulu (FI); Karri Ranta-Aho, Espoo (FI)

(73) Assignee: Nokia Corporation, Espoo (FI)

( * ) Notice: Subject to any disclaimer, the term of this patent is extended or adjusted under 35 U.S.C. 154(b) by 806 days.

(21) Appl. No.: 11/499,847

(22) Filed: Aug. 4, 2006

(65) Prior Publication Data

US 2007/0030829 A1 Feb. 8, 2007

Related U.S. Application Data

(60) Provisional application No. 60/705,831, filed on Aug. 5, 2005.

(51) Int. Cl.
*H04B 7/00* (2006.01)

(52) U.S. Cl.
USPC .......................................................... 455/522

(58) Field of Classification Search
None
See application file for complete search history.

(56) References Cited

U.S. PATENT DOCUMENTS

| | | | | |
|---|---|---|---|---|
| 4,503,533 A | * | 3/1985 | Tobagi et al. | 370/445 |
| 4,730,307 A | * | 3/1988 | Hughes et al. | 370/445 |
| 4,755,792 A | * | 7/1988 | Pezzolo et al. | 340/538 |
| 5,272,728 A | | 12/1993 | Ogawa | |
| 5,974,056 A | * | 10/1999 | Wilson et al. | 370/509 |
| 6,467,092 B1 | * | 10/2002 | Geile et al. | 725/131 |
| 6,549,785 B1 | * | 4/2003 | Agin | 455/522 |
| 6,725,054 B1 | * | 4/2004 | Hwang et al. | 455/522 |
| 6,731,948 B1 | * | 5/2004 | Lee et al. | 455/522 |
| 6,735,635 B1 | | 5/2004 | Feeny et al. | |
| 6,816,507 B1 | * | 11/2004 | Jarbot et al. | 370/465 |
| 6,859,445 B1 | | 2/2005 | Moon et al. | |
| 6,868,075 B1 | * | 3/2005 | Narvinger et al. | 370/335 |
| 6,944,232 B2 | * | 9/2005 | Koga et al. | 375/260 |
| 6,967,935 B1 | * | 11/2005 | Park et al. | 370/320 |

(Continued)

FOREIGN PATENT DOCUMENTS

| | | |
|---|---|---|
| EP | 1560339 | 3/2005 |
| GB | 2382746 | 6/2003 |

(Continued)

OTHER PUBLICATIONS

3GPP—ETSI TS 125 214 V6.6.0 (Jun. 2005) Universal Mobile Telecommunications System (UMTS); Physical layer procedures (FDD), Release 6.

(Continued)

*Primary Examiner* — Yuwen Pan
*Assistant Examiner* — Ayodeji Ayotunde
(74) *Attorney, Agent, or Firm* — Squire Sanders (US) LLP (57) ABSTRACT

The specification and drawings present a new method, system, apparatus and software product for defining a preamble length of a preamble (e.g., a power control preamble) for a discontinuous control channel transmission using, e.g., a dedicated physical control channel (DPCCH) for transmitting the preamble. The preamble length can be optimized using a predetermined criterion depending on a transmission gap length (which can be variable) in the discontinuous control signal (e.g., transmitted on the DPCCH) or in a discontinuous data signal, e.g., transmitted on an enhanced dedicated channel (E-DCH), and/or on a length of a transmission timing interval (TTI) of the discontinuous data. Furthermore, a power in the preamble can be changed in time using a further predetermined criterion.

33 Claims, 4 Drawing Sheets

(56) References Cited

U.S. PATENT DOCUMENTS

| | | | |
|---|---|---|---|
| 6,967,994 B2 | 11/2005 | Boer et al. | |
| 7,006,464 B1* | 2/2006 | Gopalakrishnan et al. | ... 370/328 |
| 7,206,597 B2 | 4/2007 | Sudo | |
| 7,212,823 B2* | 5/2007 | Granzow et al. | ............. 455/450 |
| 7,218,947 B2 | 5/2007 | Cao et al. | |
| 2002/0097697 A1 | 7/2002 | Bae et al. | |
| 2003/0086384 A1 | 5/2003 | Kwon et al. | |
| 2003/0108027 A1* | 6/2003 | Kim et al. | ..................... 370/345 |
| 2003/0224836 A1* | 12/2003 | Tsai et al. | ..................... 455/573 |
| 2004/0018832 A1* | 1/2004 | Dunham | .................... 455/422.1 |
| 2004/0087327 A1* | 5/2004 | Guo | ............... 455/522 |
| 2004/0116139 A1* | 6/2004 | Yi et al. | ......................... 455/503 |
| 2004/0170165 A1* | 9/2004 | Maciocco et al. | ............. 370/389 |
| 2004/0219931 A1* | 11/2004 | Bi et al. | ....................... 455/456.1 |
| 2004/0259548 A1* | 12/2004 | Moon et al. | .................... 455/436 |
| 2005/0147022 A1* | 7/2005 | Hosur et al. | .................. 370/203 |
| 2005/0221833 A1 | 10/2005 | Granzow et al. | |
| 2006/0023749 A1* | 2/2006 | Yoshizawa et al. | ........... 370/470 |
| 2006/0256709 A1 | 11/2006 | Yang | |
| 2007/0030829 A1 | 2/2007 | Vimpari et al. | |

FOREIGN PATENT DOCUMENTS

| | | | |
|---|---|---|---|
| JP | 2004159248 | | 6/2004 |
| KR | 20010018183 | | 3/2010 |
| WO | WO 03/044985 | * | 5/2003 |
| WO | 2004042940 | | 5/2004 |

OTHER PUBLICATIONS

3GPP—ETSI TS 125 101 v5.8.0 (Sep. 2003) Universal Mobile Telecommunications System (UMTS); User Equipment (UE) radio transmission and reception (FDD), Release 5.
3GPP TR 25.896 V6.0.0 (Mar. 2004) Technical Specification Group Radio Access Network; Feasibility Study for Enhanced Uplink for UTRA FDD.
3GPP TR 25.840 V4.0.0 (Dec. 2003) Technical Specification Group Radio Access Network; Terminal power saving features.
3GPP TR 25.214 V6.0.0 (Jun. 2005) Technical Specification Group Radio Access Network; Physical layer procedures (FDD).
"Gated Control Channel Transmission in WCDMA Forward Link" by Sami Salonen, Master's thesis, University of Oulu, Finland, 2002.
3GPP TR 25.899 V6.1.0 (Sep. 2004) Technical Specification Group Radio Access Network; High Speed Download Packet Access (HSDPA) enhancements.
TR 101 112 V3.2.0. (Apr. 1998) UMTS 30.03 version 3.2.0, Universal Mobile Telecommunications System (UMTS); Selection procedures for the choice of radio transmission technologies of the UMTS (UMTS 30.03 version 3.2.0.).
Extended European Search Report dated Mar. 3, 2010 in parallel European Patent Application No. 06820733.1 (10 pages).
3GPP TR 25.903 V0.2.0 (Nov. 2005), 3$^{rd}$ Generation Partnership Project; Technical Specification Group Radio Access network; Continuous Connectivity for Packet Data Users (Release 7), Nov. 1, 2005 (36 pages).
"UL DPCCH Gating-Further Link Level Performance Results," 3GPP TSG-RAN WG1, Meeting #45; R1-061354, Shanghai, China, May 8-12, 2006 (13 pages).
English Abstract of Korean Publication No. KR 20010018183, published Mar. 5, 2001, 1 page, Samsung Electronics Co Ltd, "Device and Method for Performing Access Communication in Mobile Communication System," Ahn Jae Min et al.
"CR 25.214-111: DPCCH power control preamble," TSG RAN Working Group 1 (Radio layer 1), TSGR1#14 (00) 0809, ALCATEL, Jul. 1-7, 2000 (3 pages).
Massimo Bertinelli and Jussi Jaatinen, Nokia Research Center, "VoIP over HSUPA: link level performance study," Wireless Communication Systems, 2006. ISWCS '06, 3$^{rd}$ International Symposium on IEEE, Sep. 1, 2006 (5 pages).
Japanese Office Action dated Jan. 4, 2011 in Japanese Application No. 2008-524619 (4 pages) and English translation thereof (7 pages).
English Abstract of Japanese Publication No. 2004159248, Sudo Hiroaki, published Jun. 3, 2004 (1 page).
Malaysian Search Report (Substantive Examination Adverse Report), mailed Feb. 28, 2011 in parallel Malaysian Patent Application No. PI 20080154 (3 pages).
Philippine Office Action in Philippine Application No. 1-2008-500142, dated May 14, 2012.
Nokia, Continuous connectivity for packet data users, 3GPP TSG-RAN WG1 Meeting #43, Nov. 7-11, 2005, RI-051463, Introduktion (4 pages).
Ericsson, Draft answer on liason on power control preamble length, 3GPP TSG-RAN WG1 #17, Stockholm, Sweden, Nov. 21-24, 2000; RI-00-1422 Fourth question (3 pages).
Yan, N.; Ho, P., "On-off keying assisted acquisition scheme for burst mode DS/SS packet radio," Vehicular Technology Conference, 1994 IEEE 44$^{th}$, vol., No., p. 586, line 8-line9 (5 pages).
Enz, C.C.; El-Hoiydi, A.; Decotignie, J-D.; Peiris, V.; "WiseNET: an ultralow-power wireless sensor network solution," Computer, vol. 37, No. 8, pp. 62-70, Aug. 2004 (9 pages).
3GPP TSG RAN WG1 Meeting #46bis RI-062988, Seoul, Korea, Oct. 9-13, 2006 (54 pages).
Digital Transmission on Fading Multipath Channels: http://zone.ni.com/devzone/conceptd.nsf/webmain/A4792F204D85239E86256DF90061D5 (11 pages).

* cited by examiner

PREAMBLE LENGTH FOR DISCONTINUOUS CONTROL CHANNEL TRANSMISSION

PRIORITY AND CROSS-REFERENCE TO RELATED APPLICATION

This application claims priority from U.S. Provisional Patent Application Ser. No. 60/705,831, filed on Aug. 5, 2005.

TECHNICAL FIELD

This invention generally relates to communications, e.g., wireless communications, and more specifically to defining a preamble length for a discontinuous control channel transmission.

BACKGROUND ART

In an uplink (a direction from a user equipment to a network), when no dedicated channels (DCHs) and no corresponding dedicated physical data channels (DPDCHs) are configured, all data is transmitted on an enhanced dedicated channel (E-DCH) which is mapped to an enhanced dedicated physical data channel (E-DPDCH). Control signaling associated with the E-DCH is transmitted on an enhanced dedicated physical control channel (E-DPCCH). The E-DPDCH and E-DPCCH can be discontinuous and are transmitted only when there is data to be transmitted and the transmission has been granted by the network. In the uplink, in addition to the E-DPDCH and E-DPCCH, a continuous dedicated physical control channel (DPCCH) and possibly a continuous or discontinuous dedicated physical control channel (e.g., an uplink high speed dedicated physical control channel, HS-DPCCH) for an HS-DSCH (high speed downlink shared channel) are transmitted.

A packet service session contains one or several packet calls depending on the application as described in ETSI standard, TR 101 112, UMTS 30.03 "Selection procedures for the choice of radio transmission technologies of the LMTS", version 3.2.0. The packet service session can be considered as an NRT (non-real time) radio access bearer duration and the packet call as an active period of packet data transmission. During the packet call several packets may be generated, which means that the packet call constitutes a bursty sequence of packets. The burstiness is a characteristic feature of the packet transmission.

The arrival of session set-ups to the network can be modeled as a Poisson process. Reading time starts when the last packet of the packet call is completely received by the user and ends when the user makes a request for the next packet call. The E-DCH transmission in the uplink is discontinuous during a reading time, such that during most of the reading time there is no E-DCH transmission. Note, that depending on the packet arrival intervals (among other things), there could be gaps in the E-DCH ) transmission during a packet call but the E-DCH transmission might also be continuous during the packet call. Thus, there can be some inactivity on the E-DCH also during a packet call.

In a UL direction from a user equipment (UE) to a network, also a signal on a high speed dedicated physical control channel (HS-DPCCH) can be transmitted. The HS-DPCCH signal typically carries 2 slots with channel quality indicator (CQI) reporting information and 1 slot with ACK/NACK information for the HSDPA. CQI transmission is typically periodic and normally independent of the HS-DSCH transmission activity. CQI reporting period can be controlled by a radio network controller (RNC) with possible values of 0, 2, 4, 8, 10, 20, 40, 80, and 160 ms. ACK/NACK is transmitted only as a response to a packet transmission on the HS-DSCH, which (similar to the E-DCH) is transmitted only when there is data to be transmitted and which depends on the reading time and packet arrival times during the packet call.

For the E-DCH transmission, a grant is needed: a non-scheduled grant for non-scheduled MAC-d (MAC stands for medium access control) flows and a serving grant (and allowed active hybrid automatic repeat request (HARQ) process) for a scheduled transmission. In the case of the scheduled MAC-d flows, a Node B controls when a user equipment (UE) is allowed to send and thus Node B knows when the UE may send data. For the non-scheduled MAC-d flows, the network can allow a maximum number of bits that can be included in a MAC-e PDU (protocol data unit) for the given MAC-d flows. In case of 2ms E-DCH TTI (transmission timing interval), each non-scheduled grant is applicable for a specific set of HARQ processes indicated by an RRC (radio resource control), and RRC can also restrict the set of HARQ processes for which scheduled grants are applicable. Also there must be a sufficient transmit power available in the UE to transmit the intended number of bits with the power level needed for intended reliability of the transmission, except for a minimum set (defined by the network), which defines a number of bits that can be transmitted on the E-DCH in the TTI also when there is not enough transmit power to maintain the intended reliability. (This minimum set for the E-DCH may only exist if there is no DCH configured for the connection.)

The UL DPCCH carries control information generated at layer 1 (physical layer). The layer 1 control information consists of, e.g., known pilot bits to support channel estimation for coherent detection, transmit power control (TPC) for DL DPCH (dedicated physical channel), optional feedback information (FBI) and optional transport format combination indicator (TFCI). Typically, the UL DPCCH is continuously transmitted (even if there is no data to be transmitted for certain time periods), and there is one UL DPCCH for each radio link. The continuous transmission is not a problem with circuit switched services, which are typically sent continuously. However, for bursty packet services, continuous DPCCH transmission causes a significant overhead.

The uplink capacity can be increased by decreasing a control overhead. One possibility for decreasing the control overhead is UL DPCCH gating (or discontinuous transmission), i.e., not transmitting signals on the DPCCH all the time.

Rationale for using gating includes (but is not limited to):
providing user equipment (UE) power savings and longer battery life;
providing interference reduction; and
providing higher capacity.

There is a fast closed loop power control for all uplink signals to combat against the power imbalance between different user signals and fast fading. The Node B, e.g., estimates continuously a signal-to-interference ratio (SIR) of the DPCCH transmitted by the UE and compares an estimate to a target value, and transmits transmit power control (TPC) commands in a downlink to the UE to increase or decrease the transmit power level. With the power control, the signals from different UEs can be received with the required quality in changing conditions.

During the uplink transmission gap the UL power control cannot operate as normally because Node B cannot estimate the received signal quality to determine the proper TPC command (the SIR would be extremely low, and normally generated TPC commands would tell the UE to increase the UL transmit power). Therefore the transmission power to be used after the gap needs to be estimated or predefined. Due to a user movement or a change in propagation conditions (fading) it is likely that in case of a long transmission gap that the power used prior the gap is not sufficient to ensure a proper communication leading to increased usage of the HARQ or too excessive thus increasing a UL noise making the UL power control and scheduling of UL capacity (e.g., in case of a high speed uplink packet access, HSUPA) more difficult.

DISCLOSURE OF THE INVENTION

According to a first aspect of the invention, a method, comprises: providing a discontinuous data signal on a data channel and a discontinuous control signal on a control channel; defining a preamble length of a preamble using a predetermined criterion, the preamble length depends on at least one of: a) a transmission gap length in the discontinuous control signal or in the discontinuous data signal and b) a length of a transmission timing interval of the discontinuous data signal; and transmitting a preamble signal comprising the preamble on the control channel.

According further to the first aspect of the invention, the preamble may be a power control preamble and the control channel may be an uplink channel transmitting the preamble signal comprising the power control preamble from a user equipment to a network element. Further, the network element may be a Node B and the network element and the user equipment may be configured for wireless communications. Still further, the minimum or maximum values for the preamble length may be provided to the user equipment by the network element. Yet still further, the uplink channel may be an uplink dedicated physical control channel and the data channel may be an enhanced dedicated channel. Further still, the defining may be provided by the network element or by the user equipment.

According further to the first aspect of the invention, the transmission gap length may be variable.

Still further according to the first aspect of the invention, before transmitting the preamble, the method may comprise: defining a time dependence of a preamble power of the preamble using a further predetermined criterion.

According further to the first aspect of the invention, during the defining, the preamble length may be changed by a preselected value using the predetermined criterion after the transmission gap length may be changed by a further preselected value.

According still further to the first aspect of the invention, the preamble length may be non-zero only if the transmission gap exceeds a pre-defined threshold value.

According further still to the first aspect of the invention, the transmitting the preamble signal on the control channel may start before or simultaneously with the data signal.

According yet further still to the first aspect of the invention, the preamble length may be variable.

According to a second aspect of the invention, a computer program product comprises: a computer readable storage structure embodying computer program code thereon for execution by a computer processor with the computer program code, wherein the computer program code comprises instructions for performing the first aspect of the invention, indicated as being performed by any component or a combination of components of a user equipment or a network element.

According to a third aspect of the invention, a user equipment, comprises: an uplink scheduling and signal generating module, for providing a discontinuous data signal on a data channel and a discontinuous control signal on a control channel, wherein a preamble length of a preamble depends, using a predetermined criterion, on at least one of: a) a transmission gap length in the discontinuous control signal or in the discontinuous data signal and b) on a length of a transmission timing interval of the discontinuous data signal; and a receiving/transmitting/processing module, for transmitting a preamble signal comprising the preamble on the control channel.

Further according to the third aspect of the invention, the transmission gap length may be variable.

Still further according to the third aspect of the invention, the preamble may be a power control preamble and the control channel may be an uplink channel transmitting the preamble signal comprising the power control preamble from the user equipment to a network element. Further, the uplink channel may be an uplink dedicated physical control channel and the data channel may be an enhanced dedicated channel. Further still, the minimum or maximum values for the preamble length may be provided to the user equipment by the network element. Yet further still, the defining may be provided by the network element.

According further to the third aspect of the invention, the uplink scheduling and signal generating module may be configured to provide the defining of the preamble length.

According still further to the third aspect of the invention, before transmitting the preamble, the user equipment may be configured to define a time dependence of a preamble power of the preamble using a further predetermined criterion.

According yet further still to the third aspect of the invention, during the defining, the preamble length may be changed by a pre-selected value using the predetermined criterion after the transmission gap length is changed by a further preselected value.

According further still to the third aspect of the invention, the preamble length may be non-zero only if the transmission gap exceeds a pre-defined threshold value.

Yet still further according to the third aspect of the invention, the transmitting the preamble signal on the control channel may start before or simultaneously with the data signal.

Still yet further according to the third aspect of the invention, the preamble length may be variable.

Still further still according to the third aspect of the invention, an integrated circuit may comprise the uplink scheduling and signal generating module and the receiving/transmitting/processing module.

According to a fourth aspect of the invention, a user equipment, comprises: means for signal generation, for providing a discontinuous data signal on a data channel and a discontinuous control signal on a control channel, wherein a preamble length of a power control preamble depends, using a predetermined criterion, on at least one of: a) a transmission gap length in the discontinuous control signal or in the discontinuous data signal and b) on a length of a transmission timing interval of the discontinuous data signal; and means for receiving and transmitting, for transmitting the power control preamble on the control channel.

According further to the fourth aspect of the invention, the means for signal generation may be configured to provide the scheduling of the discontinuous control signal.

Further according to the fourth aspect of the invention, the control channel may be an uplink channel transmitting the power control preamble from the user equipment to a network element.

According to a fifth aspect of the invention, a network element, comprises: a downlink scheduling and signal generating module, for providing a discontinuous data signal on a data channel and a discontinuous control signal on a control channel and for defining a preamble length of a preamble, wherein the preamble length depends, using a predetermined criterion, on at least one of: a) a transmission gap length, in the discontinuous control signal or in the discontinuous data signal and b) on a length of a transmission timing interval of the discontinuous data signal; and a transmitter block, for transmitting a preamble signal comprising the preamble on the control channel.

According further to the fifth aspect of the invention, the transmission gap length may be variable.

According to a sixth aspect of the invention, a communication system, comprises: a user equipment, for providing a discontinuous data signal on a data channel and a discontinuous control signal on a control channel, wherein a preamble length of a preamble depends, using a predetermined criterion, on at least one of: a) a transmission gap length in the discontinuous control signal or in the discontinuous data signal and b) on a length of a transmission timing interval of the discontinuous data signal, and for transmitting the power control preamble on the control channel; and a network element, responsive to a preamble signal comprising the preamble.

According further to the sixth aspect of the invention, the transmission gap length may be variable.

Further according to the sixth aspect of the invention, the preamble may be a power control preamble and the control channel may be an uplink channel transmitting the preamble signal comprising the power control preamble from a user equipment to a network element.

Still further according to the sixth aspect of the invention, the defining may be provided by the network element or by the user equipment.

According to the seventh aspect of the invention, the network element, comprises: a preamble block, for providing at least one of: a) a preamble defining signal defining a preamble length of a preamble for an uplink discontinuous control signal from the user equipment, b) a preamble instruction signal comprising minimum or maximum values for the preamble length, and c) a preamble feedback signal comprising feedback information on a power in the preamble for the uplink, wherein the preamble length depends, using a predetermined criterion, on at least one of: a) a transmission gap length, in the uplink discontinuous control signal or in an uplink discontinuous data signal provided by the user equipment, and b) on a length of a transmission timing interval of the uplink discontinuous data signal; a transmitter block, for transmitting the at least one of the preamble defining signal, the preamble instruction signal and the preamble feedback signal to the user equipment; and a receiver block, for receiving the uplink discontinuous control and the uplink discontinuous data signal.

According further to the seventh aspect of the invention, the transmission gap length may be variable.

MODES FOR CARRYING OUT THE INVENTION

A new method, system, apparatus and software product are presented for defining a preamble length of a preamble (e.g., a power control preamble) for a discontinuous control channel transmission using, e.g., a dedicated physical control channel (DPCCH) for transmitting the preamble. A preamble would reduce the accuracy requirement for the initial power setting after a transmission gap and also help the channel estimation and the synchronization. According to one embodiment of the present invention, the preamble length can be optimized using a predetermined criterion depending on a transmission gap length (e.g., which can be variable) in the discontinuous control signal (e.g., a DPCCH signal) transmitted on the discontinuous control channel (e.g., the DPCCH) or in a discontinuous data signal, e.g., transmitted on a data channel such as an enhanced dedicated channel (E-DCH), and/or on a length of a transmission timing interval (TTI) of the discontinuous data signal. Furthermore, a power in the power control preamble (or preamble) can be changed in time using a further predetermined criterion.

Moreover, according to an embodiment of the present invention, a network element (e.g., an RNC) can set a limit for the preamble length, e.g. from 0 up to 30 slots. Within this limit, the preamble length can be changed, depending on the DPCCH transmission gap length and on the E-DCH TTI length: the shorter the transmission gap length the shorter the preamble length, and the longer the TTI length the shorter the preamble length (e.g., for 2 ms E-DCH TTI, the same preamble length could be needed and used with a shorter transmission gap than for the 10 ms E-DCH TTI).

Furthermore, according to an embodiment of the present invention, the preamble length can be defined, e.g., by a user equipment (UE) using said predetermined criterion with or without feedback from the network (e.g., the power control preamble in 3GPP TS25.214 is defined without the feedback, and the PRACH (physical random access channel) preamble in 3GPP TS25.211 and 3GPP TS25.214 is defined with the feedback). If a preamble is used with the feedback (e.g., a power ramping type of preamble), the maximum preamble length, after which the E-DCH transmission can be started even without the preamble ending feedback from the network element (e.g., a Node B), could be dynamic. A minimum preamble will protect against DL TPC (transmit power control) errors, but a minimum preamble length may not need to be dynamic.

According to a further embodiment of the present invention, a preamble power time dependence can be defined using a further predetermined criterion including (but not limiting to): power ramping, using power step size, using higher power control step sizes until a feedback is received from the network element (e.g., the Node B), etc.

According to the predetermined criterion mentioned above, rules for defining the preamble length could be, e.g., to double the preamble length for a doubled transmission gap, to increase the preamble length by a pre-selected value (e.g., a pre-selected number of slots) after the transmission gap is changed by a further pre-selected value (e.g., a further pre-selected number of slots), or to increase the preamble length by a pre-selected value for every gap during a long E-DCH inactivity. The rules for defining the preamble length (including the maximum preamble length defined above) can also have a variety of similar dependences as a function of the TTI lengths.

According to a further embodiment of the present invention, the predetermined and further predetermined criteria for defining the preamble can also include (but not be limited to):
- transmitting the preamble only on the DPCCH channel with no E-DCH or HS-DPCCH transmission;
- having different channel structures for the preamble (e.g., a pilot only) and/or power control behavior (e.g., higher step sizes and/or starting from lower power level than before the transmission gap and increasing power until some of the feedback is received from the Node B)
- transmitting the preamble partly simultaneously with transmissions on the E-DCH or HS-DPCCH after the transmission gap, if a feedback defined stop for a preamble power control behavior is used.

It is noted that all embodiments of the present invention described above for the control channel, e.g., the UL DPCCH, can be applied to any L1 control channel in the UL (carrying, e.g., pilot and/or power control information) used for, e.g., channel estimation and power control and for downlink control channels as well. It is also noted, that defining the preamble length can be performed by the UE or by the network element, according to embodiments of the present invention. Also, it is noted that various embodiments of the present invention recited herein can be used separately, combined or selectively combined for specific applications.

Figure 1:
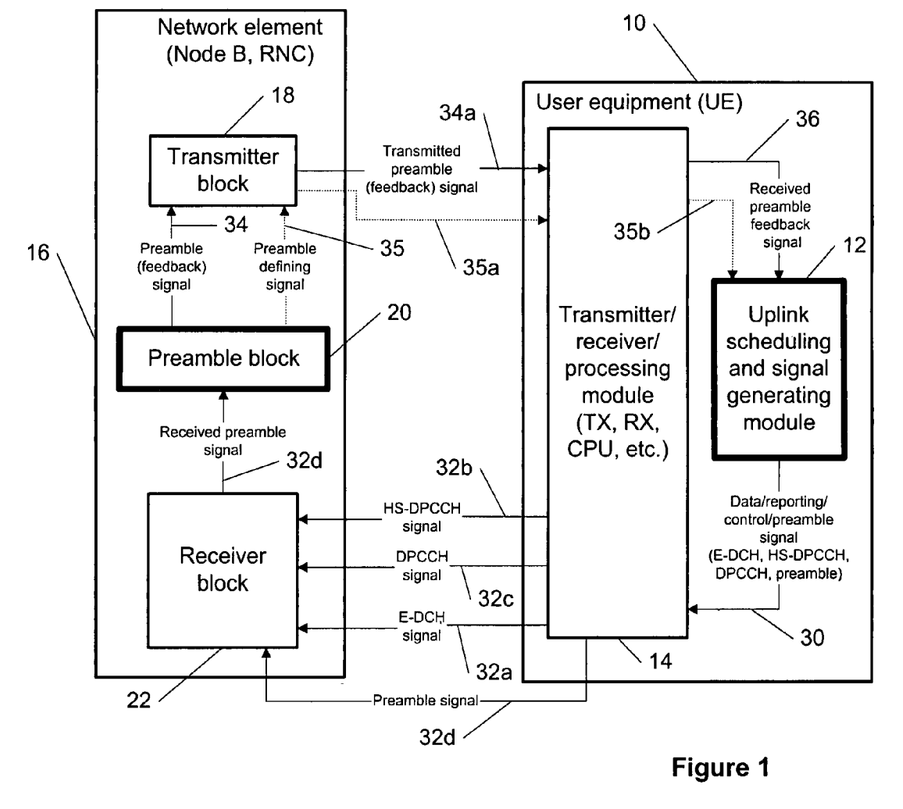
FIG. 1 is a block diagram demonstrating defining a preamble length of a power control preamble for a discontinuous control channel transmission using, e.g., a dedicated physical control channel (DPCCH) for transmitting the preamble, according to an embodiment of the present invention.

FIG. 1 shows a block diagram of an example among others which demonstrates defining the preamble length of the power control preamble for the discontinuous control channel transmission using, e.g., the dedicated physical control channel (DPCCH) for transmitting the preamble.

In the example of FIG. 1, a user equipment 10 comprises an uplink scheduling and signal generating module 12 and a transmitter/receiver/processing module 14. Steps performed by the user equipment 10 related to defining the preamble can be coordinated and originated by the module 12. The user equipment 10 can be a wireless device, a portable device, a mobile communication device, a mobile phone, etc. In the example of FIG. 1, a network element 16 (e.g., a node B or a radio network controller, RNC) comprises a transmitter block 18, a preamble block 20 and a receiver block 22. The preamble block 20 can be optionally used for providing (see feedback or instruction signals 34, 34a and 36) a power control feedback on the uplink preamble and/or pre-defined threshold for the preamble length to the user equipment 10 or, alternatively, for defining the preamble length (see signals 35, 35a and 35b), according to different embodiments of the present invention.

According to an embodiment of the present invention, the module 12 (the same is applicable to the block 20) can be implemented as a software or a hardware block or a combination thereof. Furthermore, the module 12 can be implemented as a separate block or can be combined with any other standard block of the user equipment 10 or it can be split into several blocks according to their functionality. The transmitter/receiver/processing block 14 can be implemented in a plurality of ways and typically can include a transmitter, a receiver, a CPU (central processing unit), etc. The module 14 provides an effective communication of the module 12 with the network element 16 as described below in detail. All or selected modules of the user equipment 10 can be implemented using an integrated circuit, and all or selected blocks and/or modules of the network element 16 can be implemented using an integrated circuit as well.

The module 12 provides a data/reporting/control/preamble signal 30, according to embodiments of the present invention, which is then forwarded (signals 32a, 32b, 32c and 32d, wherein signals 32c and 32d are both transmitted on the DPCCH) to the receiver block 22 of the network element 16. Specifically, the module 12 provides a discontinuous data signal (e.g., an E-DCH signal 32a) and a report signal (e.g., an HS-DPCCH signal 32b) containing a channel quality indicator (CQI) reporting information and a discontinuous control signal (e.g., a DPCCH signal 32c). Furthermore, the module 12 optimizes the preamble length, using the predetermined criterion depending on a transmission gap length (which can be variable) in the discontinuous DPCCH signal 32c or in the discontinuous E-DCH signal 32a, and/or on a length of a transmission timing interval (TTI) of the E-DCH signal 32a (also the power dependence in the power control preamble can be optimized using the further predetermined criterion by the module 12).

It is also shown in FIG. 1 that the network element 16 can use the received preamble signal 32d (which can be alternatively defined as a special format of the DPCCH signal) for proving a power control feedback (the preamble feedback signal 34). FIG. 1 further demonstrates (see signals 35, 35a and 35b) an embodiment wherein controlling the preamble length can be completely or partly performed by the network element 16 (e.g., by the block 20), according to an embodiment of the present invention. The preamble length is defined at the user equipment 10 according to the predetermined and further predetermined criteria which are known also by the network element 16.

Figure 2:
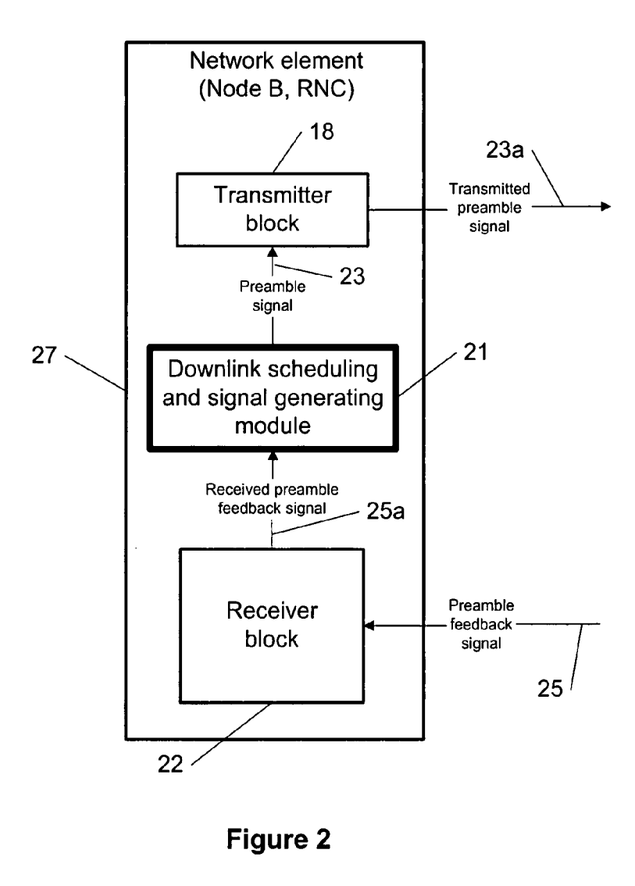
FIG. 2 is a block diagram demonstrating defining a preamble length in DL, according to an embodiment of the present invention.

The example of FIG. 1 demonstrates defining the preamble length according to embodiments of the present invention in the UL direction. The same principles can be applied to the DL direction, according to an embodiment of the present invention. FIG. 2 demonstrates such an arrangement wherein a downlink scheduling and signal generating module 21 of a network element 27 is used the same way as the module 12 in FIG. 1 to define the preamble for the DL transmission using the predetermined and further predetermined criteria, thus providing a preamble signal 23 which is then transmitted (a preamble signal 23a) downlink by the transmitter block 18. Similarly to the UL case, the power feedback (signals 25 and 25a) can be optionally provided to the block 21 using the receiver block 22.

It is noted that the network element 16 or 27, for the purposes of understanding of various embodiments of the present invention, can be broadly interpreted such that the network element 16 can comprise features attributed to both the Node B and the radio network controller (RNC). Specifically, the module 20 or 21 can be located in the RNC (then the signaling from the RNC is forwarded to the user equipment by the Node B) or in the Node B, whereas the block 22 is located in the Node B.

Figure 3:
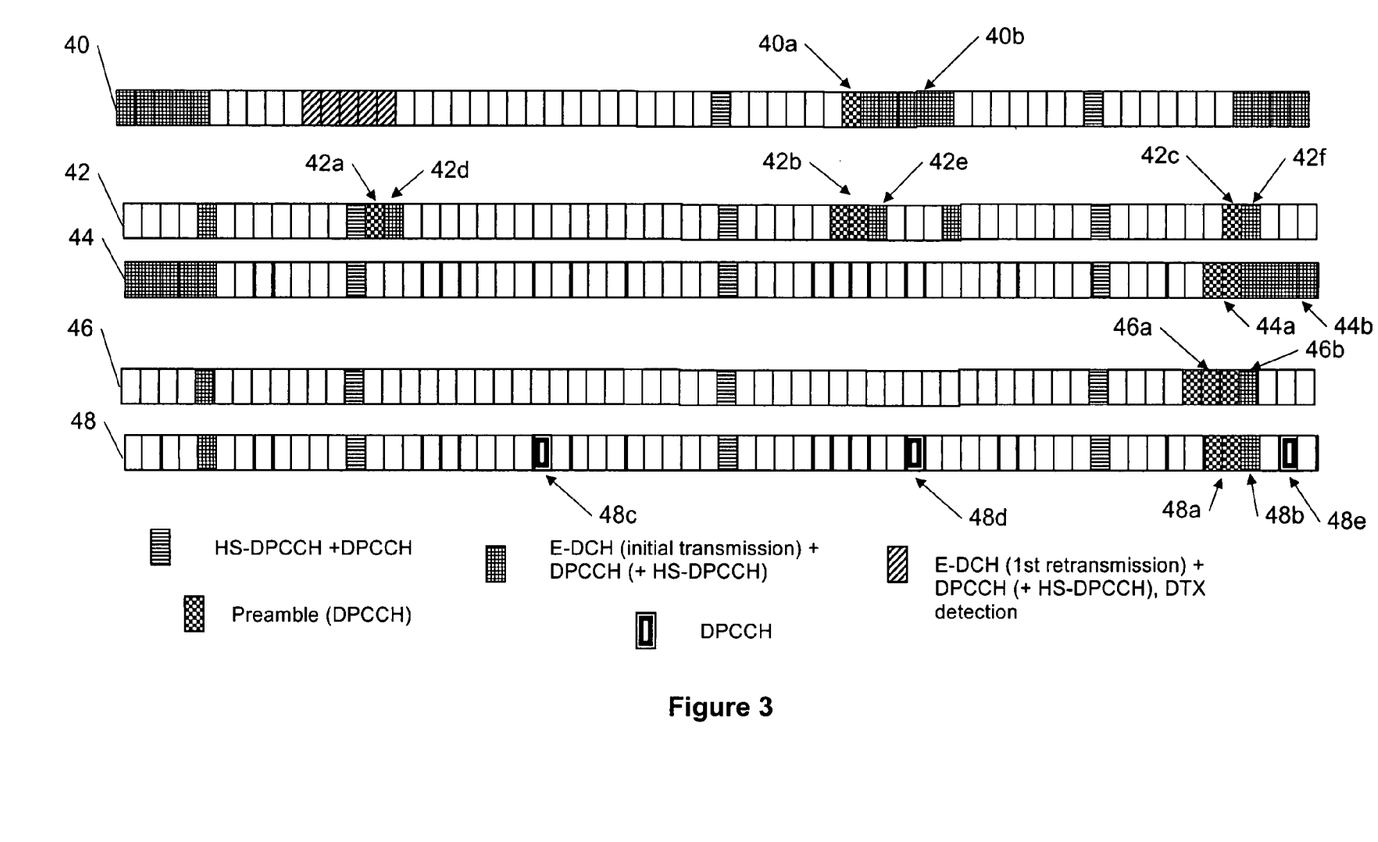
FIG. 3 is a diagram demonstrating examples defining a preamble length of a power control preamble, according to an embodiment of the present invention.

FIG. 3 shows one example among others of a diagram demonstrating defining the preamble length, according to embodiments of the present invention. Note that one slot in FIG. 3 is considered to be 2 ms.

A packet sequence 40 shows the HS-SCCH (high speed shared control channel for HS-DSCH) signal illustrating the DL activity (the HS-DSCH signal is not shown).

A packet sequence 40 demonstrates the dynamic preamble length for 10 ms E-DCH TTI and 40 ms CQI reporting period (transmitted on the HS-DPCCH channel). The preamble in a slot 40a with the length of 2 ms preceeds the second E-DCH signal in slots 40b (TTI=10 ms) as the preamble length is defined based on the transmission gap and the TTI length using the predetermined criterion described above.

A packet sequence 42 demonstrates the dynamic preamble length for 2 ms E-DCH TTI and 40 ms CQI reporting period (transmitted on the HS-DPCCH channel). The preambles in slots 42a, 42b and 42c with the length of 2, 4 and 2 ms, respectively, preceed the second, third and fifth E-DCH signals in slots 42d, 42e and 42f (TTI=2 ms), respectively, as the preamble length and its frequency is defined based on the transmission gap and/or the TTI length using the predetermined criterion described above. The more frequent use and longer length (e.g., in the slot 42b) of the preamble in the packet sequence 42 compared to the packet sequence 40 is due to the shorter TTI length in spite of the fact that the transmission gap between the E-DCH signals in the packet sequence 42 is smaller compared to the packet sequence 40.

A packet sequence 44 again (to be compared with the packet sequence 40) demonstrates the dynamic preamble length for 10 ms E-DCH TTI and 40 ms CQI reporting period (transmitted on the HS-DPCCH channel). The preamble in a slot 44a with the length of 4 ms preceeds the second E-DCH signal in slots 44b (TTI=10 ms) as the preamble length is defined based on the transmission gap and the TTI length using the predetermined criterion. The difference with the packet sequence 40 is that the preamble 44a has a longer length due to a larger transmission gap between E-DCH signals in the packet sequence 44.

A packet sequence 46 (to be compared with the packet sequence 44) demonstrates the dynamic preamble length for 2 ms E-DCH TTI and 40 ms CQI reporting period (transmitted on the HS-DPCCH channel). The preamble in slots 46a with the length of 6 ms preceeds the second E-DCH signal in a slot 46b (TTI=2 ms) as the preamble length is defined based on the transmission gap and the TTI length using the predetermined criterion described above. The difference with the packet sequence 44 is that a longer length (e.g., in the slot 46a) of the preamble in the packet sequence 46 compared to the packet sequence 44 (e.g., in the slot 44a) is due to the shorter TTI length in the packet sequence 46.

Finally, a packet sequence 48 (to be compared with the packet sequence 46) demonstrates the dynamic preamble length for 2 ms E-DCH TTI, 40 ms CQI reporting period (transmitted on the HS-DPCCH channel) and with DPCCH control signals 48c, 48d and 48e with a period of 20 ms. The preamble in slots 48a with the length of 4 ms precedes the second E-DCH signal in slots 48b (TTI=2 ms) as the preamble length is defined based on the transmission gap and the TTI length using the predetermined criterion described above. The difference with the packet sequence 44 is that a shorter length (e.g., in the slot 48a) of the preamble in the packet sequence 48 compared to the packet sequence 46 (e.g., in the slot 46a) is due to the shorter transmission gap in the DPCCH signal in the packet sequence 48.

Figure 4:
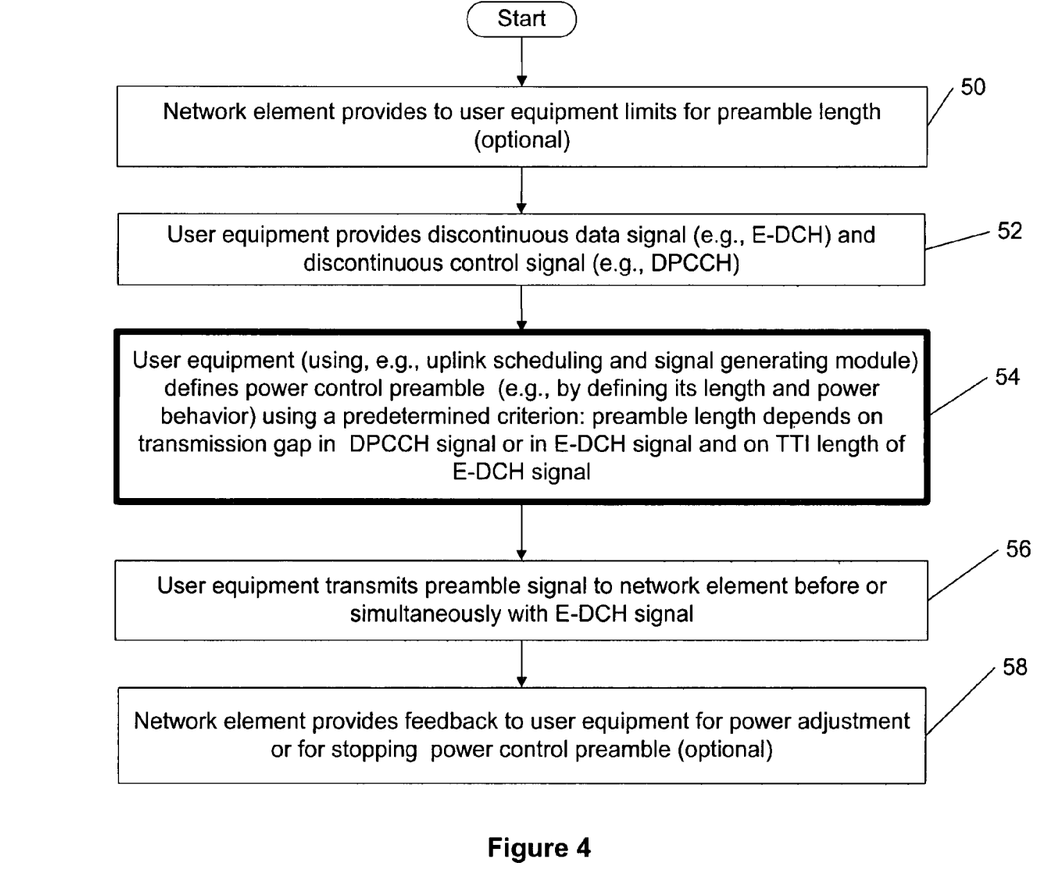
FIG. 4 is a flow chart illustrating defining a preamble length of a power control preamble for a discontinuous control channel transmission using, e.g., a dedicated physical control channel (DPCCH) for transmitting the preamble, according to an embodiment of the present invention.

FIG. 4 is an example of a flow chart definition of the preamble length of the power control preamble for the discontinuous control channel transmission using, e.g., the DPCCH for transmitting the preamble, according to an embodiment of the present invention.

The flow chart of FIG. 4 only represents one possible scenario among others. The order of steps shown in FIG. 4 is not absolutely required, so generally, the various steps can be performed out of order. In a method according to an embodiment of the present invention, in a first step 50 the network element 16 provides to the user equipment 10 limits (e.g., the minimum and/or the maximum values) for the preamble length (this step is optional). In a next step 52, the user equipment 10 provides the discontinuous data signal (e.g., the E-DCH signal) 32a and the discontinuous control signal (e.g., the DPCCH signal) 32c. In a next step 54, the user equipment 10 (using, e.g., the uplink scheduling and signal generating module 12) defines the power control preamble (e.g., by defining its length and the power behavior) using the predetermined criterion: the preamble length depends on the transmission gap in DPCCH signal 32c or in the E-DCH signal 32a and on the TTI length of the E-DCH signal 32a as well as the further predetermined criterion described above.

In a next step 56, the user equipment 10 transmits the preamble signal 32d (which can be alternatively defined as a special format of the DPCCH signal) to the network element 16 before or simultaneously with the E-DCH signal 32a.

Finally, in a next step 58, the network element 16 provides the feedback (the signals 34, 34a and 36) to the user equipment 10 for the power adjustment or for the stopping power control preamble (this step is optional).

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   providing a discontinuous data signal for transmission on a data channel transmitted from a user equipment to a network element and a discontinuous control signal for transmission on a control channel that is transmitted separate from said data channel from said user equipment to said network element;
   defining a preamble length of a power control preamble according to a predetermined criterion, wherein said preamble length depends on a transmission gap length in said discontinuous control signal or in said discontinuous data signal, wherein the predetermined criterion is a length of time prior to the control signal or the data signal being transmitted in uplink;
   transmitting a preamble signal comprising said power control preamble on said control channel before or simultaneously with said data signal on said data channel; and
   receiving feedback for power adjustment.

2. The method of claim 1, wherein said transmission gap length is variable.

3. The method of claim 1, wherein said preamble length is non-zero only if said transmission gap length exceeds a predefined threshold value.

4. The method of claim 1, wherein said preamble length is variable.

5. A non-transitory computer readable medium comprising code that when executed causes a computer processor to perform the method of claim 1.

6. An apparatus comprising: at least one processor and at least one non-transitory computer readable medium including software configured to, with the at least one processor, cause the apparatus at least to: provide a discontinuous data signal for transmission on a data channel transmitted from a user equipment to a network element and a discontinuous control signal for transmission on a control channel that is transmitted separate from said data channel from said user equipment to said network element, wherein a preamble length of a power control preamble is defined according to a predetermined criterion, said preamble length depends on a transmission gap length in said discontinuous control signal or in said discontinuous data signal, wherein the predetermined criterion is a length of time prior to the control signal or the data signal being transmitted in uplink; transmit a preamble signal comprising said power control preamble on said control channel before or simultaneously with said data signal on said data channel; and receive feedback for power adjustment.

7. The user equipment of claim 6, wherein said transmission gap length is variable.

8. The apparatus of claim 6, wherein before said apparatus is caused to transmit said preamble, said at least one processor and said at least one non-transitory computer readable medium including software are further configured to cause said apparatus to define a time dependence of a preamble power of said preamble.

9. The apparatus of claim 6, wherein said at least one processor and said at least one non-transitory computer readable medium including software are further configured to cause said apparatus to change said preamble length by a pre-selected value after said transmission gap length is changed.

10. The apparatus of claim 6, wherein said preamble length is non-zero only if said transmission gap length exceeds a pre-defined threshold value.

11. The apparatus of claim 6, wherein said preamble length is variable.

12. A user equipment, comprising: means for signal generation, for providing a discontinuous data signal for transmission on a data channel transmitted from a user equipment to a network element and a discontinuous control signal for transmission on a control channel that is transmitted separate from said data channel from said user equipment to said network element, wherein a preamble length of a power control preamble is defined according to a predetermined criterion, said preamble length depends on transmission gap length in said discontinuous control signal or in said discontinuous data signal, wherein the predetermined criterion is a length of time prior to the control signal or the data signal being transmitted in uplink; and means for receiving and transmitting, for transmitting said power control preamble on said control channel before or simultaneously with said data signal on said data channel and for receiving feedback for power adjustment.

13. The user equipment of claim 12, wherein the means for signal generation is configured to provide scheduling of said discontinuous control signal.

14. The user equipment of claim 12, wherein said control channel is an uplink channel transmitting said power control preamble from said user equipment to a network element.

15. An apparatus, comprising: at least one processor and at least one non-transitory computer readable medium including software configured to, with the at least one processor, cause the apparatus to provide a discontinuous data signal for transmission on a data channel transmitted from a user equipment to a network element and a discontinuous control signal for transmission on a control channel that is transmitted separate from said data channel from said user equipment to said network element; define a preamble length of a power control preamble according to a predetermined criterion, wherein said preamble length depends on a transmission gap length in said discontinuous control signal or in said discontinuous data signal, wherein the predetermined criterion is a length of time prior to the control signal or the data signal being transmitted in uplink; transmit a preamble signal comprising said power control preamble on said control channel before or simultaneously with said data signal on said data channel; and receive feedback for power adjustment.

16. The apparatus of claim 15, wherein said transmission gap length is variable.

17. An apparatus, comprising: at least one processor and at least one non-transitory computer readable medium including software configured to, with the at least one processor, cause the apparatus to receive an uplink discontinuous control transmitted from a user equipment on a control channel and an uplink discontinuous data signal separately transmitted from said user equipment on a different data channel, and transmit, in response to a preamble signal comprising a power control preamble from said user equipment, a preamble feedback signal comprising feedback information for a power adjustment, wherein a preamble length of said power control preamble is defined according to a predetermined criterion, said preamble length depends on a transmission gap length in said uplink discontinuous control signal or in said uplink discontinuous data signal provided by the user equipment, wherein the predetermined criterion is a length of time prior to the control signal or the data signal being transmitted in uplink.

18. The apparatus of claim 17, wherein said transmission gap length is variable.

19. The method of claim 1, wherein said preamble length depends on at least one of said transmission gap length in said discontinuous control signal and a length of a transmission timing interval of said discontinuous data signal.

20. The method of claim 1, wherein said preamble length depends on said transmission gap length in said discontinuous control signal and a length of a transmission timing interval of said discontinuous data signal.

21. The method of claim 1, wherein a shorter preamble length depends on a shorter transmission gap length.

22. The method of claim 19, wherein a shorter preamble length depends on a shorter transmission gap length or a longer transmission timing interval.

23. The method of claim 20, wherein a shorter preamble length depends on a shorter transmission gap length and a longer transmission timing interval.

24. The apparatus of claim 6, wherein said preamble length depends on at least one of said transmission gap length in said discontinuous control signal and a length of a transmission timing interval of said discontinuous data signal.

25. The apparatus of claim 6, wherein said preamble length depends on said transmission gap length in said discontinuous control signal and a length of a transmission timing interval of said discontinuous data signal.

26. The apparatus of claim 6, wherein a shorter preamble length depends on a shorter transmission gap length.

27. The apparatus of claim 24, wherein a shorter preamble length depends on a shorter transmission gap length or a longer transmission timing interval.

28. The apparatus of claim 25, wherein a shorter preamble length depends on a shorter transmission gap length and a longer transmission timing interval.

29. The method of claim 1, wherein said preamble length is measured as one or more slots of a frame.

30. The apparatus of claim 6, wherein said preamble length is measured as one or more slots of a frame.

31. The user equipment of claim 12, wherein said preamble length is measured as one or more slots of a frame.

32. The apparatus of claim 15, wherein said preamble length is measured as one or more slots of a frame.

33. The apparatus of claim 17, wherein said preamble length is measured as one or more slots of a frame.

\* \* \* \* \*